Dec. 25, 1951     O. R. CARPENTER     2,580,374
METHOD OF PRODUCING CLAD PLATE
Filed Oct. 4, 1947     4 Sheets-Sheet 1

INVENTOR
Otis R. Carpenter
BY
ATTORNEY

Dec. 25, 1951  O. R. CARPENTER  2,580,374
METHOD OF PRODUCING CLAD PLATE
Filed Oct. 4, 1947  4 Sheets-Sheet 2

INVENTOR
*Otis R. Carpenter*
BY
*M. Holbrook* ATTORNEY

Dec. 25, 1951  O. R. CARPENTER  2,580,374
METHOD OF PRODUCING CLAD PLATE
Filed Oct. 4, 1947  4 Sheets-Sheet 3

INVENTOR
Otis R. Carpenter
BY
Holbrook ATTORNEY

Patented Dec. 25, 1951

2,580,374

UNITED STATES PATENT OFFICE 2,580,374

METHOD OF PRODUCING CLAD PLATE

Otis Richard Carpenter, Barberton, Ohio, assignor to The Babcock & Wilcox Company, Rockleigh, N. J., a corporation of New Jersey Application October 4, 1947, Serial No. 777,973

3 Claims. (Cl. 219—10)

This invention relates to clad plate welding, and more particularly to improvements in the method of clad plate welding in which a relatively thin alloy sheet is welded to a thick base plate by the formation of successive lines of spot welds bonding the sheet and the plate, such a method being indicated by my Patent 2,275,419, March 10, 1942.

In this clad plate method such a large number of spot welds are necessary to bond the sheet and the plate that, from the standpoint of production cost alone, it is important to reduce the number of the welds to a degree consistent with the formation of a good bond between the sheet and the plate. It is also important that the time consumed in the welding operation be reduced to a minimum, again consistent with the production of the effective bond between the sheet and the plate. These factors have led to the use of rotating electrodes through which the welding current and pressures are applied to the alloy face of the plate and sheet assembly, the electrodes having rolling contact during the production of the lines of bonding welds and the relative motion between the electrodes and the work.

In this alloy clad plate method the object is to obtain as near a full bond of the alloy sheets to the steel backing material as possible and at the same time obtain consistently good welding over as much of the area as possible. The use of continuously rotating electrodes as commonly applied to resistance seam welding operations has been found, with the aid of certain electrical and mechanical modifications hereinafter described, to result in a resistance welded clad plate with a total bonded area far greater than heretofore possible and with a strength of bond far in excess of the 20,000 p. s. i. minimum shear strength which is recognized by code authorities as necessary for an integrally bonded plate.

The improvements of the present invention, making stronger resistance welds possible on heretofore unknown close centers, have resulted from studies of the actions of the electrical circuits involved, studies of the application of pressures to continuously moving electrodes and studies of the developed surface contact resistances. Each of these factors has been found to exercise an important influence upon shunt current problems, which, in turn, determine, to a large degree, the character and strength of the successive spot weld involved.

In the commercial welding of an alloy face sheet to a base plate, the optimum results are:

(a) a thermal bond between the alloy face member and the base plate to attain low temperature differential conditions under heat transfer;

(b) a strong uniformly distributed bond between the sheet and the plate in order to maintain the initial welded structural and heat conductive relations.

It has been suggested, as in my earlier patent, above identified, that such welding be accomplished by initial short current pulses, followed by a final longer current pulse, this multiple pulse welding being accomplished without modification of the contact pressure of the electrode against the work.

The present invention improves upon such procedure by regulated variation of the current and electrode pressures for the successive welding pulses, for each weld, the new procedure overcoming troubles arising from shunt current problems inherent in making welds on such close centers.

This invention also involves a modification of the character of the welding cycle in that the initial welding step is effected by a current pulse under an initial pressure, while the second step is effected at a short time interval thereafter while the electrode is still in substantially the same position relative to the work, but with a substantially greater pressure exerted by the electrode against the work, and with a current flow substantially higher in amperage than that in the initial phase.

Such a sequence of steps is effective in accomplishment of high heat conductive and structurally strong welds in the completed plate in that shunt currents particularly in the final high temperature phase of the weld cycle are minimized and thereby the heating of the metal is more effectively localized in the weld zone, and the tendency of overheating at the electrode contact is also minimized.

The illustrative method will be described by reference to the accompanying drawings in which there is shown preferred apparatus by means of which the method is effected.

Figure 1:
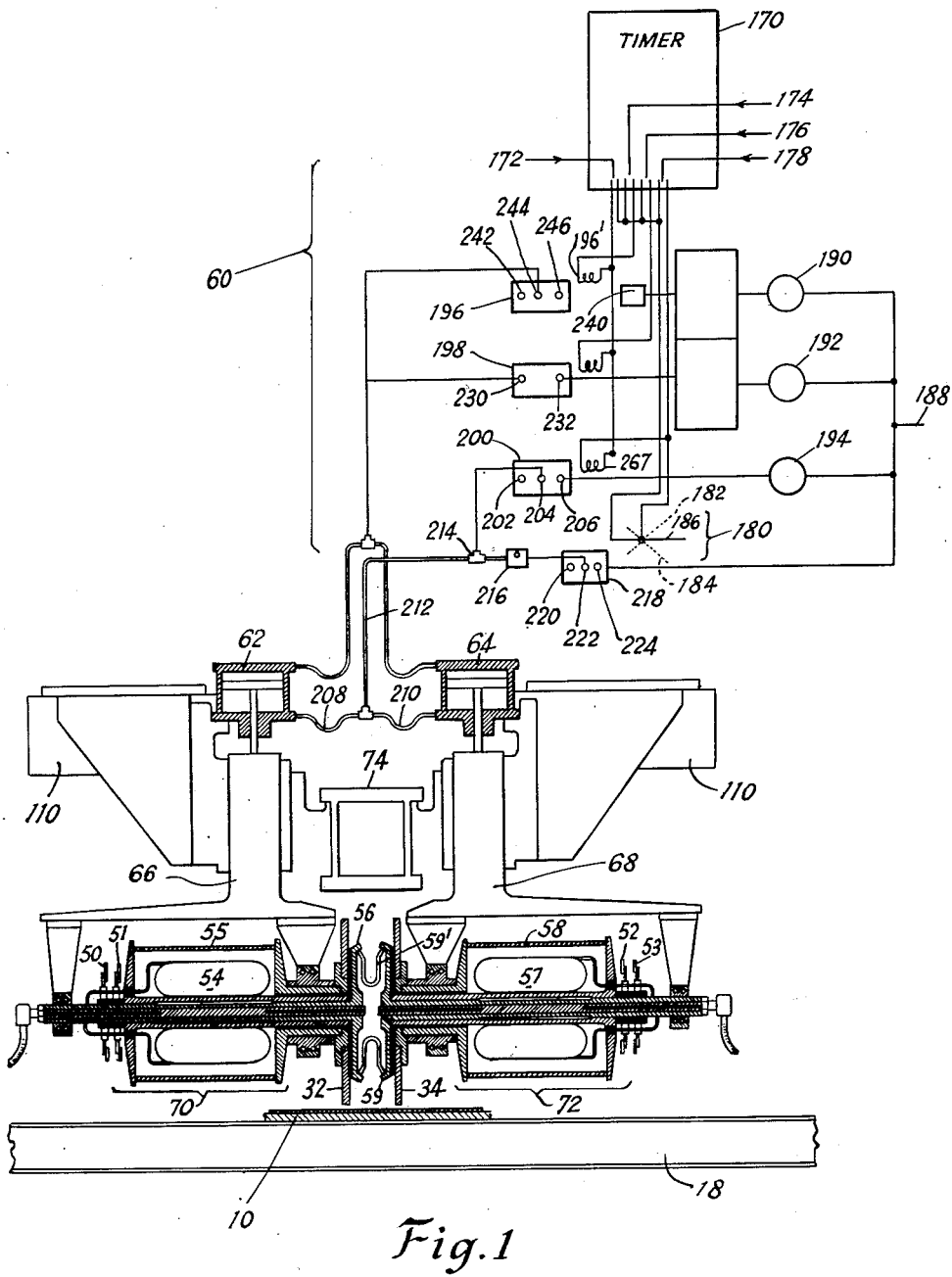
Fig. 1 is a composite view showing the apparatus by which the illustrative method is effected.

The illustrative method of welding produces clad plates of substantial area. By way of example, a base plate 10 of high carbon steel has immediately superposed thereon a nickel sheet 12, and above the nickel sheet there are a plurality of alloy steel sheets 14 and 16. These elements, in the arrangement shown in Fig. 4, are disposed upon beams 18-26, inclusive, (Fig. 2) within a tank or reservoir 30 and a pair of rolling electrodes such as 32 and 34 are caused to traverse the clad plate assembly from one end to the other and then reversely, forming overlapping resistance welds such as those indicated in the separated rows of welds A, B, C, D, and E, in Fig. 3. The rolling electrodes, after the completion of two rows of resistance welds across the clad plate assembly are moved out of contact with the work and then moved transversely for the formation of other rows of welds in the reverse travel across the clad plate assembly. For example, the rows of resistance welds A and D may be formed by a first traverse of the welding rows in the direction indicated by the arrows 40 and 42 (Fig. 3) and the rows B and E formed on the next succeeding reverse travel across the clad plate assembly.

Considering the welding operation starting with the welds 44 and 46 of rows A and D, the electrodes 32 and 34 are first disposed at these positions and in contact with the upper sheet 14 in the clad plate assembly.

Then an initial electrode pressure is exerted downwardly, and simultaneously, initial electrode current is caused to pass from the electrode 32 through the sheets 12, 14, and 16 and into the base plate toward the other electrode 34. These electrodes are the terminals of a high amperage, low voltage secondary, and the current for the initial step of the welding is timed in a pulse of a predetermined number of cycles of current. Such current application is controlled by an electrode timer, connected through an ignitron switching circuit to the terminals 50—53 of the primaries of the transformers of which the electrodes 32 and 34 are the secondary terminals. The terminals 50 and 51 apply to the primary coils 54 with which the casing 55, with its terminals 32 and 56 acts as a single turn secondary. The terminals 52 and 53 similarly apply to the primary coils 57, with which the casing 58, with its terminals 34 and 59 acts as a single turn secondary. The transformer secondaries are series joined by a plurality of flexible connectors 59' between terminals 56 and 59. During the initial welding pulse, electrode pressure against the work, regulated by a pressure regulating system generally indicated at 60 (Fig. 1), is reduced to a minimum value at which the surface contact resistance in the weld zone will prevent the welding current from burning or otherwise undesirably affecting the surface of the alloy sheet 14. After a short period of initial current flow (i. e. 10-55 cycles) and a short cooling time (i. e. 5-20 cycles) immediately subsequent thereto, a second pulse of current accompanied by a higher electrode pressure is applied. During this second step in the illustrative method, the pressure, for example, is substantially increased (i. e. from 25-37#, line pressure). During the second step, the current density of the weld is also increased (i. e. from 350 to 500 amperes). The current pulse of the second step with the accompanying pressure increase gives greater depth of penetration, increases an area of the weld, and allows higher currents to flow for shorter periods. This is an important factor in successful welding of alloys such as austenitic steels because higher current densities are required to produce effective welds and yet if such higher current densities are utilized for excessively long time periods, the properties of the alloy are apt to be substantially affected.

During the welding steps, the entire welding zone is subject to the cascade flooding of the electrodes with a fluid coolant.

In the illustrative arrangement, the pressure relief is accomplished through the agency of the pressure regulating system 60 acting through the pressure cylinders 62 and 64 upon the attached vertical slides 66 and 68. In the relief of this pressure after the second welding step, it may be said that reverse pressure is applied, causing upward movement of the slides 66 and 68 and raising the composite welding units 70 and 72 with their electrodes 32 and 34. This re-establishes original conditions and gives more consistent welds for the full length of each seam.

Figure 2:
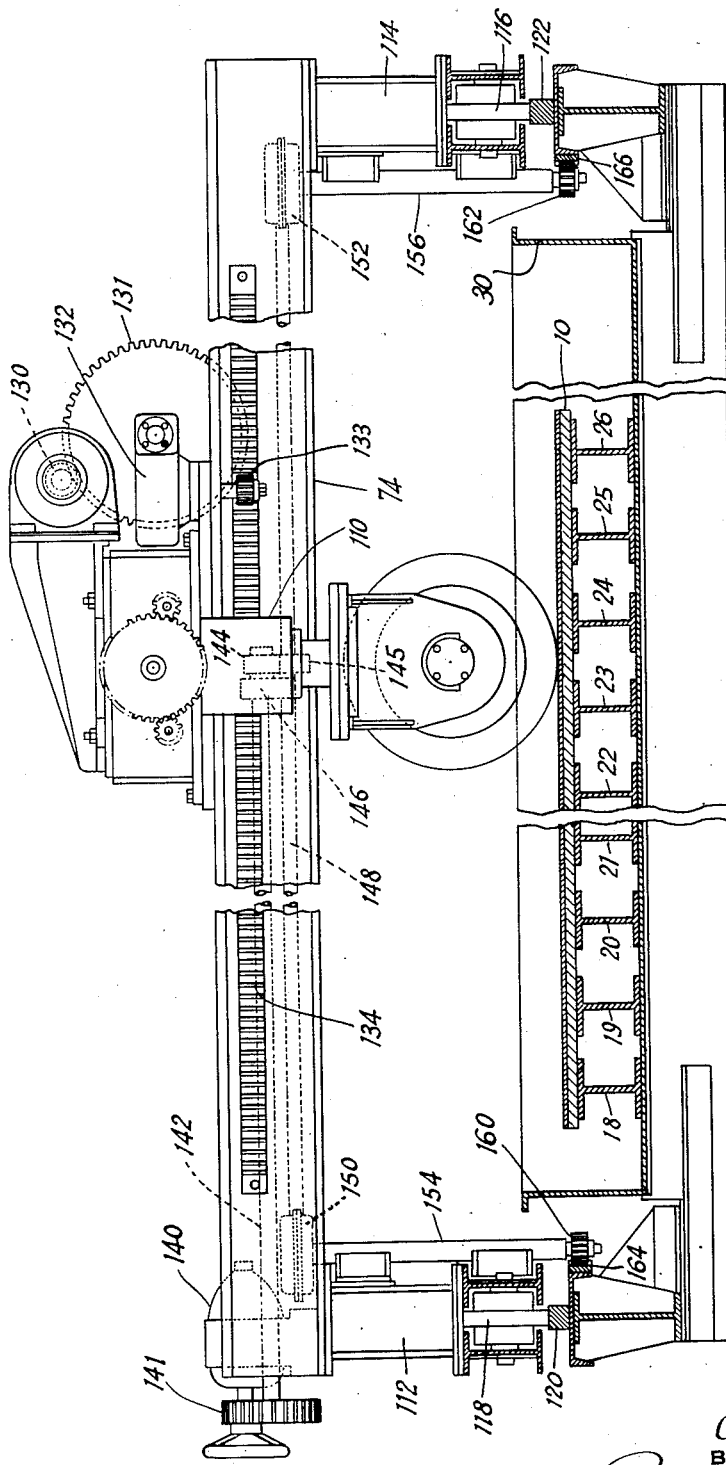
Fig. 2 is a view in the nature of an elevation showing a mechanism by which the rolling electrodes are caused to traverse the work.
Figure 3:
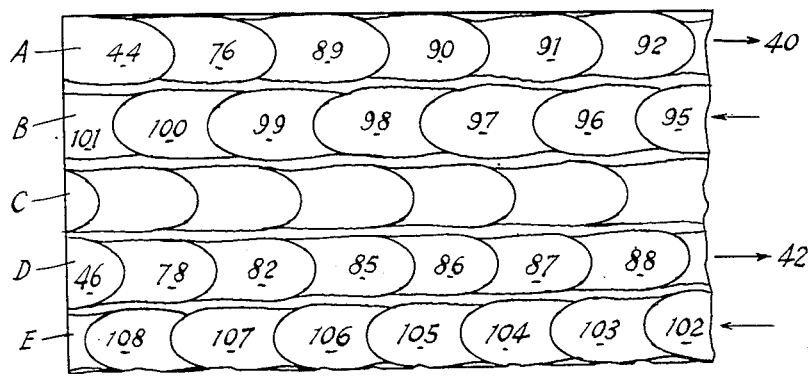
Fig. 3 is a plan of the clad plate formed by the illustrative method.
Figure 4:
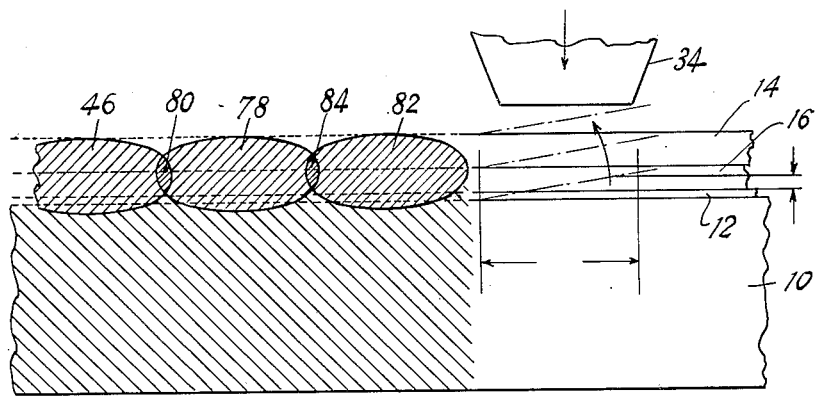
Fig. 4 is a diagrammatic view in the nature of a vertical section through the clad plate showing the relations of the cladding sheets before welding and the relation of the successive spot welds in a single row.

Next, the welding electrodes are carried by their transformers units 70 and 72 along the bridge beam structure 74 (Fig. 2) to succeeding weld positions such as 76 and 82 in Fig. 3, where the welding steps, as above described, are repeated, producing for example such welds as that indicated at 82, in Fig. 4, the weld 82 is shown as overlapping the weld 78 in the intersecting zone indicated at 84. In a similar manner the weld 46 is shown as having its fusion zone overlapping the fusion zone of weld 78 as indicated at 80.

In Fig. 3 the remaining welds of the seams A and D are indicated at 85-92, inclusive, and the overlapping welds of the next succeeding seams B and E are indicated at 95-108, inclusive.

It will be noted in Fig. 3 that there is indicated a spacing of successive or adjacent seams of overlapping rows. In the illustrative method, this spacing renders less difficult the problem of forming effective spot welds in a row or seam adjacent the previously completed seam. The use of spot welds on close centers over an extended area makes the problem of shunt currents a difficult one. Shunt current is the by passing of a part or all of the welding current through completed welds rather than through the contact surface at the point of electrode pressure. Where shunt currents are excessive, poor or interrupted welding is apt to result, along with overheating of the electrode contact surface. To overcome the effects of such shunt currents, the spacing between individual welds may be increased to such an extent that the current path formed through the completed adjacent weld is one of higher resistance, higher than that formed under the electrode by the pressure contact with the clad material of the electrode roll and the base plate. While the effects of such shunt currents are to be avoided on close center welds such as the welds of the separate seams above indicated, contact resistance between the electrode and the alloy sheet, and the latter and the base plate, must be reduced to a value low enough to give a voltage drop along this path lower than that along the path involving the completed weld. This is accomplished by use of a high electrode pressure. When the distance between adjacent seams, or between the separate spot welds, is small, the force required to place the alloy sheets in sufficient contact with the base plate to overcome excessive shunt currents is great. The cladding layers may be considered as a beam supported at the weld 82 (Fig. 4) and free on the other or opposite end. The force P required to deflect it may then be in proportion to the square of the alloy thickness. Therefore, an increase in the number of sheets or layers used to make the cladding will make the electrode pressure more effective in obtaining a low enough resistance path for the current to pass through this area in preference to the entire path to the finished weld.

The nickel layer such as 12 (Fig. 4) is used for two basic reasons. First of all, it is an aid in the prevention of carbon migration from the base plate 10 to such alloy sheets as 14 and 16. Secondly, this nickel layer aids materially in increasing the total area bonded to the base plate. The flexibility of the sheets 12, 14 and 16 allows the welding pressure to be effectively transmitted to the surfaces to be joined. Nickel will bond to the steel base plate at a relatively low temperature, and the use of the nickel sheet results in improved heat transfer properties of the resultant clad plate.

The apparatus used to effect the illustrative method is indicated in Fig. 1 as involving two transformer and electrode units. The vertical slides 66 and 68 for supporting the composite transformer and electrode units 70 and 72 are carried by a carriage 110 which is slidably mounted upon the bridge 74 supported at its end by columns 112 and 114 (Fig. 2). The latter are, in turn, supported by the rollers 116 and 118 for traverse of the work along the rails 120 and 122.

The carriage 110 preferably carries an electric motor which operates suitable gearing devices 130—133 to cause the electrodes to rollingly transverse the work by engagement of the pinion 133 with the rack 134 fixed to the bridge.

A motor 140 operates through the gearing 141, the shaft 142, the gears 144—146, the shaft 148, the power transmissions 150 and 152, the shafts 154 and 156, the pinions 160 and 162, and the fixed racks 164 and 166, to cause the bridge to move electrodes to new seam positions on the work after completion of each pair of seams.

The pressure regulating system indicated in Fig. 1 of the drawings includes a timer 170, a power supply circuit 172, a time relay circuit 174, a high pressure timing relay circuit 176 and a reverse pressure relay circuit 178. The circuit 176 is also effective to cut out the heat control potentiometer set for the first weld pulse. It further operates a second heat control potentiometer during the high pressure application to give higher heat on the second pulse of a two-pulse weld. The reverse pressure relay circuit 178 involves a manual air valve lever 180 having an up position 182, a down position 184, and a middle or natural position 186. This lever controls the valve 218, and effects exhaust of the reverse pressure through a limit switch which energizes the solenoid 267 to open the exhaust port 202 when the lever 180 is thrown to its down position. The air pressure line 188 is connected through the low pressure regulator 190, the high pressure regulator 192 and the reverse pressure regulator 194, these regulators being connected respectively to the valves 196, 198 and 200. The latter is a two-way valve, normally closed, and having an "exhaust" connection 202, an "out" connection 204, and an "in" connection 206.

The reverse pressure connections to the cylinders 62 and 64 include the lines 208, 210, 212, the T 214, the check valve 216 and the valve 218 with its "exhaust" connection 220, its "out" connection 222, and "in" connection 224.

The valve 198 has an "out" connection 230 and an "in" connection 232.

The valve 196 is a normally open valve associated with a check valve 240 and having an "exhaust" connection 242, an "out" connection 244, and an "in" connection 246.

The pressure regulator system is caused by the timer 170 and its various valves and connections to be effective to produce the low, high, and reverse pressures, in the sequence required for the illustrative method.

The timer 170 is a standard N. E. M. A. type 5-B automatic repeat timer, having its cool-time circuit modified to effect the illustrative double pressure and double current welding method. The specific sequence of the resistance welding steps effected by the timer and as correlated with the double pressure and double current system will be further referred to later.

During the first pulse of the illustrated method (the first application of heating current) the normally open solenoid operated valve 196 (Fig. 1) allows air pressure, as regulated by the low pressure air regulator 190, to flow to the electrode pressure cylinders 62 and 64. When this pressure (i. e. about 20 p. s. i.) is put into these cylinders and the electrodes thereby caused to engage the work with the initial pressure, the timer causes the first pulse of current to flow between the electrodes and through the work. At the end of this initial current pulse high pressure air, as regulated by the high pressure regulator 192, is caused to enter the cylinders 62 and 64 by the action of the high pressure solenoid operated valve 198. This valve is operated by the cool-time delay circuit of the timer, the air line pressure being, for example, 25 or 30 pounds. At the end of the cool-time the second pulse of current is caused by the timer to flow between the electrodes and through the work while electrodes are under the higher pressure. This second pulse of current is also of an amperage higher than that used during the initial current pulse, (i. e. from 350-500 amperes).

When the two pulses of current flow are completed, and after the current is shut off, the solenoid operated two-way valve 200 releases the high pressure air from the cylinders 62 and 64 and introduces a reverse pressure which momentarily releases all pressure upon the work. The squeeze time section of the timer then initiates a repetition of the cycle.

Figure 5:
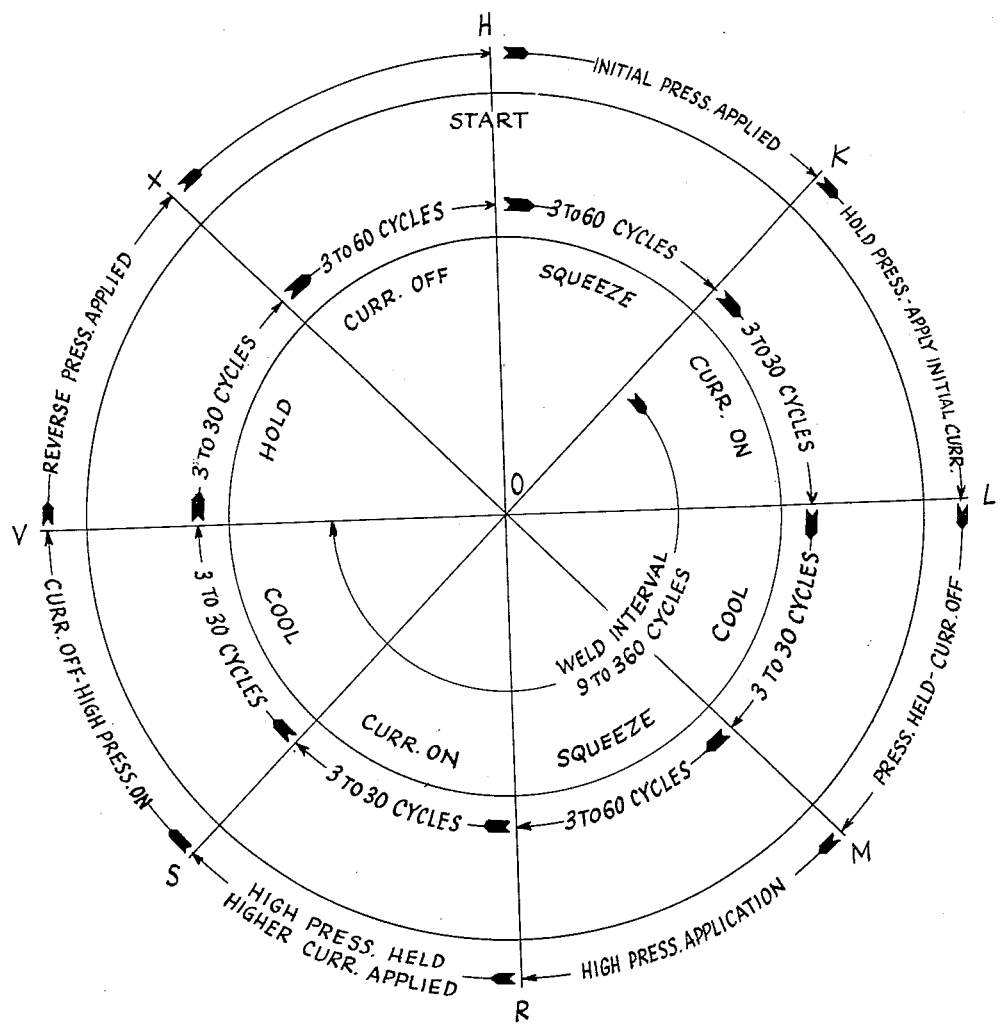
Fig. 5 is a diagrammatic figure indicating the consequence of operations effected by the timer and its associated pressure regulating system and appropriate electrical connections.

The sequence of operations of the illustrative method, effected by the timer 170 in conjunction with the pressure regulating system 60 and an appropriate system of electrical connections between the timer and the transformers, is diagrammatically illustrated in Fig. 5. In this figure, the starting position is indicated by the sector line "OH." The first action is the application of the initial electrode pressure upon the work by the timer operating through the pressure regulating system. The time for application of this pressure is indicated by the sector HO, such time being variable, by adjustment of the timer, from 3 to 60 cycles.

The initial pressure is held during a second part of the entire sequence of operations, indicated in Fig. 5 by the sector KOL. This part of the method may be varied from 3 to 30 cycles. At the start of this part of the operation, the current for the first step of the welding is applied and held during the adjusted time indicated by the sector KOL.

At the end of the second part of the welding method represented by the sector KOL, the application of electrical current is discontinued, but the electrode pressure is held during the part of the method represented by the sector LOM, adjustably variable from 3 to 30 cycles, as indicated. During the part of the method represented by this sector LOM, the metal is allowed to cool, this part of the method being controlled by the cool-time relay of the time, and its electrical circuits.

The higher electrode pressure of the welding method, is applied, and held or continued through the part of the operation represented by the sector MOR and the parts represented by the immediately succeeding sectors ROS and SOV.

The time of application of the higher electrode pressure may be adjustably regulated, by adjustment of the timer, to a value within the range of from 3 to 60 cycles. When the application of higher pressure has been held for the time indicated by the sector MOR, the current of higher value for the second part of the pulse welding method is applied. This higher value of current continues for a period adjustably variable from 3 to 30 cycles, and it is continued to a time diagrammatically indicated by the sector line OS.

Immediately following the application of the higher value current for the second step of the welding method, there is a cool-time represented by the sector SOV, adjustably variable from 2 to 30 cycles.

At the end of the cool-time SOV, reverse pressure is applied to the electrode pressure cylinders 62 and 64. This pressure substantially counterbalancing the weight of the transformer-electrode assemblies is held for a time indicated by the sector VOX.

During the last part of the method, represented by the sector XOH, there is no application of the current and no application of electrode pressure.

The invention method is related to that described and claimed in U. S. Patent No. 2,515,176, issued July 18, 1950, to F. W. Armstrong, Jr., for "Method of Clad Plate Resistance Welding." The illustrated apparatus is the same as that described and claimed in U. S. Patent No. 2,515,264, issued July 18, 1950, to R. P. C. Rasmussen for "Welding Apparatus."

What is claimed is:

1. In the production of clad plate in which a cladding sheet of corrosion-resistant alloy is surface bonded to a much thicker metallic base plate; bonding the clad sheet to the base plate by a plurality of successively formed parallel rows of overlapping resistance welds; the initial step of said bonding including the application of an initial electric current pulse and an initial electrode pressure, the latter being sufficiently high to reduce the electrical surface contact resistance between the sheet and the plate to a value such that the initial pulse will not deleteriously affect the surface of the sheet; interposing a cooling period of a few cycles after the discontinuance of current flow; applying and maintaining a higher electrode pressure; while maintaining such higher electrode pressure, applying a higher value current flow to complete the welding of the sheet and plate at the zone of the initial step; repeating the above series of operations in successively overlapping weld zones to ultimately form a row of welds across the clad plate assembly; and similarly forming similar and closely spaced rows of welds at successive positions.

2. In a method of forming clad plate having sheet metal cladding surface bonded to a much thicker metallic base plate; said method including the simultaneous application of an initial cladding-to-plate welding pressure and an initial resistance welding current at widely spaced weld zones at the interface of the plate and the cladding; discontinuing said current application of initial current while maintaining such pressure and interposing a cooling time for a predetermined period involving a small number of cycles; then, in a second stage, applying to said weld zones and maintaining a greater cladding-to-plate pressure and, while maintaining such greater pressure, applying to said weld zones a resistance welding current of a value much greater than the initial current; discontinuing said second stage current application after a predetermined number of cycles, discontinuing said second stage higher pressure application, interposing a weld setting period of a few cycles, repeating the above specified steps at successive and similarly spaced weld zones to form rows of successive welds, the successive welds in the weld zones of each row being formed at a center-to-center spacing of the order of the maximum dimensions of the zones, repeating the above specified steps in successive spaced rows of weld zones some of which are between the first made rows, and varying the pressure inversely with the spacing of said weld zones and rows to an extent sufficient to minimize shunt current flow through completed welds to produce strong welds effectively bonding the cladding and the plate.

3. In the formation of clad plate, superposing a sheet of cladding metal of high current resistance characteristics upon a much thicker metallic base plate, simultaneously applying relatively low electrode pressure and a relatively low electric welding current to two widely spaced initial resistance welding zones at the interface of the plate and the sheet, the electrode pressure for this initial step being sufficiently high to reduce the surface contact resistance to a value preventing shunt current effects from having a substantial deleterious effect on the surface of the alloy sheet, discontinuing the initial step electric current application while continuing such pressure application for a brief weld cooling period, then applying to said weld zones an electrode pressure having a value greater than the pressure during the initial step and, after the commencement of the application of the increased electrode pressure, applying to said weld zones an electric current of much higher value then the current during the initial step to give a deeper weld penetration into the metal of the base plate and to afford increased areas allowing higher currents for shorter periods, discontinuing the electric current application and the higher pressure application, repeating the above specified series of actions after relative motion between the work and electrodes brings the electrodes to next succeeding weld zones centered at a spacing from the centers of the first weld zones of a value of the order of the width of the first welds, continuing all of said actions in successive weld zones along a line to form a row of welds extending across the assembly, and repeating all of the above steps in successive lines to form other spaced rows of welds until the sheet is effectively surface bonded to the base plate.

OTIS RICHARD CARPENTER.

REFERENCES CITED

The following references are of record in the file of this patent:

UNITED STATES PATENTS

| Number | Name | Date |
| --- | --- | --- |
| 2,214,002 | Trainer et al. | Sept. 10, 1940 |
| 2,272,968 | Dyer | Feb. 10, 1942 |
| 2,275,419 | Carpenter | Mar. 10, 1942 |
| 2,423,067 | Hansen et al. | June 24, 1947 |

OTHER REFERENCES

"Machinery," October 1944, page 158.